United States Patent Office 2,783,125
Patented Feb. 26, 1957

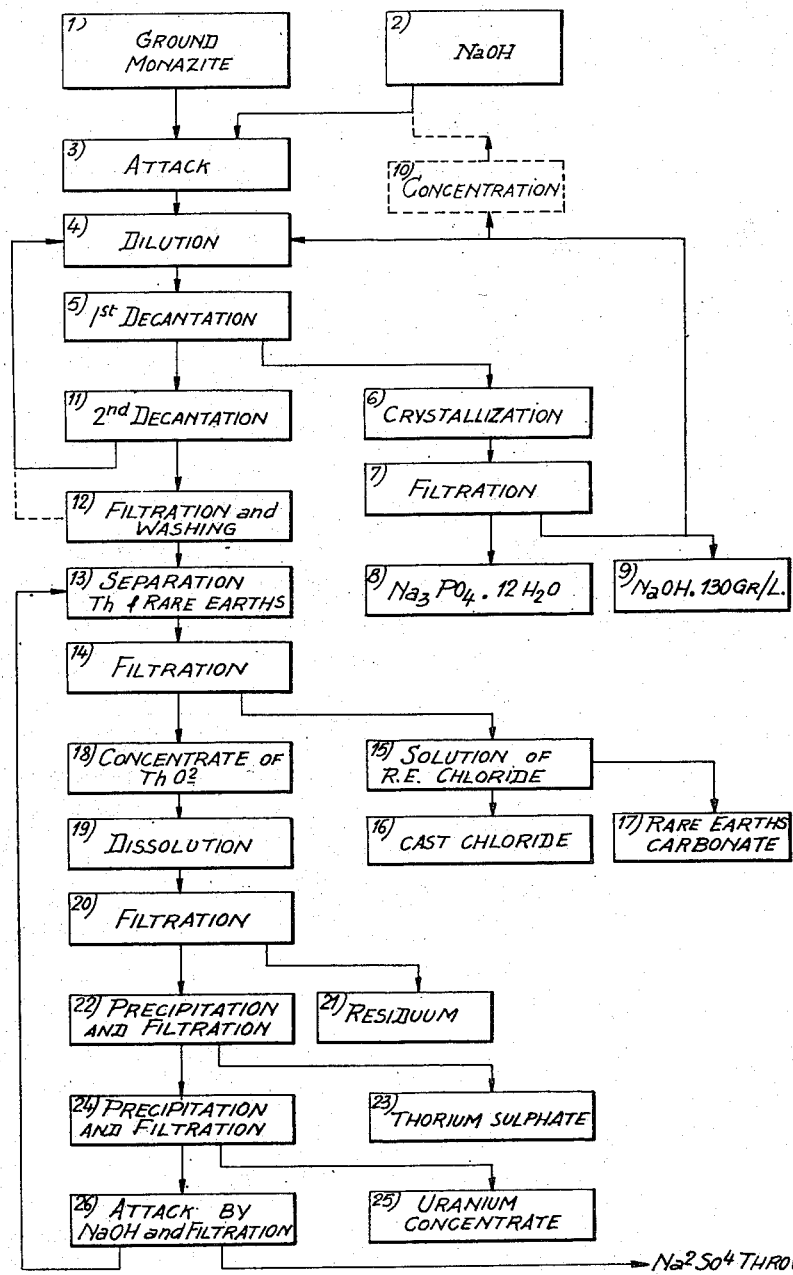

2,783,125

TREATMENT OF MONAZITE

Charles de Rohden, Neuilly-sur-Seine, and Maurice Peltier, Beaumontel, France, assignors to Societe de Produits Chimiques des Terres Rares, Paris, France Application July 18, 1950, Serial No. 174,544

Claims priority, application France July 21, 1949

10 Claims. (Cl. 23—14.5)

It has been known for a long time that monazite (a phosphate of rare earths and thorium) may be attacked by caustic soda. Nevertheless the only treatment used up to the present by industry is to carry out the attack by sulphuric acid, in spite of the drawbacks resulting therefrom. The principal drawbacks are:

(a) Loss of the phosphoric acid content, in spite of its value, as a result of the complications to which its recuperation leads.

(b) Small solubility of the sulphates obtained, necessitating the preparation of dilute solutions, and as a result large volumes.

(c) Bad separation of the thorium and rare earths, enforcing large returns of intermediary fractions.

(d) High costs of maintenance of the plant treating very corrosive solutions (sulpho-phosphoric acid).

In spite of the drawbacks of the acid process, the alkaline process has not yet become a practical method. This is due to the fact that it can not give satisfactory results from an industrial point of view, unless it is carried out under certain technical conditions, which up to the present moment have not been determined.

The present invention precisely has for its object a method of alkaline treatment of monazite which meets this demand.

According to the invention, after an attack of the monazite, at a temperature near the boiling point of the reacting medium, by NaOH in a concentration comprising between 55 and 70%, and preferably nearly 65% NaOH, the substance is retreated with hot (above 55°) water or with a mother-liquor recovered from a subsequent operation, to separate, on the one hand, the insoluble hydroxides, and the other, the soluble sodium phosphate, the hydroxides then undergoing a process of separation of the rare earths from the thorium and uranium.

The retreatment of the substance after attack by the NaOH may be done by hot water used in a quantity larger than 4.5 cubic meters per ton of monazite treated so that the dissolution of the phosphate shall be sufficiently complete, but preferably lower than 8 cubic meters per ton in order to avoid too high dilutions which would lead to a bad yield in the crystallization of the sodium phosphate.

A good proportion is around 5.5 cubic meters of water per ton of monazite treated.

There could be used, in preference to pure water for this retreatment, a mother liquor coming from the crystallization of the phosphate or from a second subsequent retreatment of the hydroxides by the hot water.

The alkaline solution containing sodium phosphate is separated from the hydroxides by filtering or settling; this last-named method appears to be preferable and will be advantageously completed by a filtration step. The sodium phosphate is collected by subsequent crystallization.

In this case, the mother-liquor of this crystallization is a solution of caustic soda lye at about 130 grams per liter, which may be concentrated, for instance by evaporation, and used again for the initial attacking operation of the monazite.

The hydroxides remaining after separation of the alkaline solution containing the phosphate are advantageously washed with a dilute solution of NaOH to ensure a better elimination of the phosphates, the most concentrated wash water resulting from this operation being able to be used again for the first retreatment of the substances resulting from the initial attack of the monazite by the NaOH.

It is advantageous in order to carry out the rest of the operations of the present process with good conditions of yield that the retreatments and washings of the hydroxides shall be performed in such a way that the remainder of $P_2O_5$, in relation to the weight of hydroxide shall be less than 1% and even preferably around 0.4% or even lower.

According to the invention, the hydroxides thus prepared are treated, so as to separate the rare earths and the thorium.

The hydroxides are at first treated by a mineral acid such as HCl, $H_2SO_4$ or $HNO_3$ under conditions permitting the separation of the thorium.

According to a first species of the invention, the dissolution of the whole of the hydroxides is effected by an acid in excess of the theoretical quantity, the solution separated from the unattacked residue then being partly neutralized for instance by admixture of rare earth carbonates, up to a pH of around 4, in order to precipitate the thorium.

According to a second species of the invention, which permits obtaining comparable results from a point of view of yield and quality and which is preferable owing to a saving of reagents and the obtaining of a less voluminous precipitate, hydroxides are placed in suspension in the water and acid is added until the pH shall be equal to about 3.2 so that 95% at least of the rare earths shall be dissolved and then collected in the form of pure salt the whole of the thorium and uranium which remain insoluble being separated in the form of a high concentrate of $ThO_2$ at 90–95% in relation to the total oxides, containing about 3% of $P_2O_5$ in relation to the oxide of thorium $ThO_2$ accompanied by unattacked ore.

The thorium concentrate thus obtained may be purified by any known suitable means. For instance by oxalate or fluoride, with or without recuperation of the anion. Nevertheless, according to the invention the process may be carried out as follows:

This concentrate is dissolved in hydrochloric or nitric acid in excess, sulphuric acid being excluded; the solution is separated from the unattacked residuum by filtration and then is treated by sulphuric acid to precipitate the thorium in the form of its sulphate which crystallizes.

The mother-liquor of crystallization of the thorium sulphate is then treated by a potassium salt:potassium sulphate, for instance, to precipitate the thorium remaining in the form of double sulphate of potassium and thorium which carries along the rare earths present, but leaves the uranium in the mother-liquor.

This mixture of thorium and rare earths may be retreated with the object of improving the yield, and returned again in the cycle. For this purpose the double sulphate will be attacked by caustic soda, the sodium sulphate being eliminated by washing and the hydroxides being sent back to the first operation of separating the thorium by the acids.

By way of example and to facilitate the understanding of the description, there has been shown on the accompanying drawing, the flow sheet of a complete cycle of operations according to the invention, and there will be described hereinafter, with numbered references to this table, how the operations may be carried out.

1. *Preparation of the monazite.*—About one ton of ore is finely ground, so as to pass through a 200 sieve with a maximum of 10% oversize to sieve 300. The product is preferably moistened and transformed in the cold into a pulp without lumps.

2. *Preparation of the attacking lye.*—A solution of about 1 ton of sodium hydroxide is prepared so that its NaOH content shall be around 65% at the moment of the attack in the operation (3).

3. *Attack of the monazite.*—The NaOH solution is gradually admixed to the monazite and the temperature is kept to 140–145° C. during 2 to 5 hours—generally 3 to 4 hours.

The attacked percentage is usually from 98 to 100% of the monazite.

4. *Retreatment.*—(A) In the case where the retreatment is made with pure water, about 5.5 cubic meters of water is used at a temperature higher than 55° and preferably comprised between 70° C. and 80° C.

(B) In the case where a mother-liquor coming from a subsequent decantation is utilized, about 6.5 cubic meters of mother-liquor may be used, comprising 5 cubic meters of mother-liquor coming from the decantation 11 described hereinafter, to which will be profitably added 1.5 cubic meters about 130 grams per liter of NaOH coming from the recuperation operation (9) after draining operations (7).

The retreatment is carried out at a temperature higher than 60° C. and preferably comprised between 70° C. and 85° C.

The advantages of this cycle of mother-liquor are:

(1) A very hot filtration is avoided in the operation (12) hereinafter described, which facilitates the operation and saves the filter cloth.

(2) A more concentrated NaOH lye is obtained on draining operation without exaggerating the thickness of the phosphate mixture to be drained.

5. *First decantation.*—The attack with NaOH has transformed the ore into a mixture of insoluble hydroxides in suspension in an alkaline solution of phosphate of sodium. They may be separated by filtration, but it is preferable to operate by decantation and to decant the alkaline solution.

6. *Crystallization of the sodium phosphate.*—This is carried out simply by cooling.

7. *Filtration.*—The crystals of phosphate are drained of filtered and washed.

8. *Production of the phosphate.*—About 1.5 tons of trisodic phosphate $Na_3PO_4 12H_2O$ is thus produced which corresponds to about 45% of the soda put into operation for the attack (3) and over 90% of the $P_2O_5$ contained in the ore. These crystals are of commercial quality and may be delivered to the trade.

9. *Recuperation of the caustic soda.*—The mother-liquor (9) collected at this filtration is a NaOH lye at about 120–150 grams per liter NaOH and 4 to 5 grams per liter $P_2O_5$ corresponding to 40 to 45% of the NaOH used for the attack. About 3.5 cubic meters are collected. This mother-liquor may be used in soap-making, for the manufacture of bleaching water, etc.

10. *Concentration of the mother-liquor of crystallization.*—This mother-liquor may, if preferred, be concentrated in (10) by evaporation and used again as attacking caustic soda in (3), which represents a saving of 40 to 45% of the NaOH necessary for this attack.

In this case, the balance sheet of NaOH will be as follows, for 1 ton of monazite:

| Attack | | Recuperation | |
|---|---|---|---|
| | Kilos | | Kilos |
| Fresh NaOH | 600–550 | NaOH of the trisodic phosphate | 450 |
| NaOH recuperated | 400–500 | Recuperated NaOH | 450–400 |
| | | NaOH lost | 100–150 |
| | 1,000 | | 1,000 |

11. *Second decantation.*—The hydroxides may be retreated a second time. This time the operation is carried out at a higher temperature than 25°, preferably at 40–50°.

After decantation, at about 20% of the initial volume 1.1 to 1.5 cubic meters of suspension is produced, containing about 700 kilos of oxides.

The mother-liquor coming from this second decantation may be, as aforementioned, used again for the operation of the first retreatment (4).

12. *Filtration and washing.*—After the second decantation, the filtration may be carried out almost cold, without fear of crystallizations. The solution is not corrosive for iron.

First of all the washing is preferably done with a solution of caustic soda, for instance at 80 grams per liter, then with water. The retreatments and washings of the hydroxides are thoroughly developed until the $P_2O_5$ in relation to the weight of hydroxide is lower than 1% and preferably about 0.4% or even less.

A cake is produced with about 60% oxides.

13. *Separation of the rare earths and thorium.*—This operation must be made according to one of the two following ways:

(A) *Procedure by total dissolution*

The hydroxides are dissolved in hydrochloric, nitric or sulphuric acid in slight excess (for instance 5%) on the quantity theroretically necessary.

The solution is filtered (if it is desired together with substances facilitating the filtration) and the thorium is precipitated by a controlled addition of carbonate of rare earths up to a pH close to 4. The thorium is separated from the solution of rare earths by filtration.

(B) *Procedure by extraction*

Hydrochloric acid is gradually added to the hydroxides mixed with water corresponding to almost the quantity necessary for forming neutral salts of rare earths.

The operation proceeds for several hours and must be carried out with precaution by watching the pH carefully and avoiding an excess of acid: final pH close to 3.2.

The iron is oxidized preferably in the ferric state during this operation, either by hydrogen peroxide, or by an hypochlorite, so as to eliminate it from the solution.

14. *Filtration.*—The solution is filtered, if desired with substances aiding the filtration. This gives:

(a) Over 95% (generally 98% of the rare earths rendered soluble by the attack), in the form of a solution of almost pure chloride (stage 15), particularly free from $P_2O_5$, $SO_3$, $ThO_2$, $Fe_2O_3$ which are the troublesome impurities for the use of rare earths, at a concentration which may reach, if desired 350 to 450 grams per liter of oxides, and which may be transformed, either in cast chloride of commercial quality simply by evaporation (stage 16), or in pure carbonate by precipitation by sodium carbonate (stage 17).

(b) The whole of the thorium attacked, and the uranium in the form of a concentrate at 90–95% of $ThO_2$/total oxides and about 3% $P_2O_5/ThO_2$, accompanied (in the case of the B species) by the unattacked ore and impurities (stage 18).

19. *New dissolution.*—The thorium concentrate is dissolved in hydrochloric (or nitric) acid (excluding sulphuric acid) in excess of 50%, for instance, on the theoretical quantity, so as to produce a solution of chloride (or nitrate) at 130–150 grams per liter of $ThO_2$. This solution will be at 60–70° as a result of the evolved heat. If the ore contains silica or impurities difficult to filter, it can be clarified by any usual means so as to facilitate its filtration, which may be carried out in the hot or cold.

20. *Filtration.*—The residua of the attack are separated by filtering. Such residua are rejected after conventional washing. They only represent 0 to 2% of the monazite used (residuum 21).

22. *Precipitation and filtration (separation of the thorium.*—There is admixed to the cold solution dilute sulphuric acid, containing about 125 kilos of $H_2SO_4$ to crystallize the thorium sulphate, and this is then filtered. This is also produced in (23) in a commercially pure state with a yield of nearly 90%.

24. *Precipitation and filtering of the rare earths.*—The fraction of thorium present in the mother liquor is recovered by addition of a potassium salt, the sulphate preferably, until the mother-liquor contains 30 grams per liter of $K_2SO_4$. The operation may be done while cold. The thorium precipitates in the form of a double sulphate of potassium and thorium which carries away with it the rare earths present, and leaves the uranium in the mother-liquor.

This uranium may be collected by neutralizing the mother-liquor, in the form of a concentrate, accompanied by a little of the rare earths, thorium and other impurities arising from the initial sand, such as the iron. It is extracted therefrom profitably by treatment with sodium carbonate and precipitation by caustic soda.

26. *Attack by the soda and filtration.*—The double sulphate is profitably attacked by the caustic soda (stage 26) and the hydroxides produced are, after elimination by washing of sodium sulphate, reintroduced into the cycle for instance at stage 13.

This recuperation moreover only affects a small percentage of the oxides treated.

These final recuperations (24 and 26) allow the recycling of about 10 to 12% of the initial thorium and 1 to 2% of the initial rare earths.

Having now particularly described and ascertained the nature of our said invention, and in what manner the same is to be performed, we declare that what we claim is:

1. A method of treating monazite in order to recover valuable products therefrom which comprises finely grinding said monazite to pass through a 200 sieve, treating said finely comminuted monazite with a NaOH solution of 55 to 70 percent concentration at about the boiling point of the solution, retreating the NaOH digested monazite with water at a temperature above 55° C., separating the mixture of insoluble hydroxides containing the rare earth elements, thorium and uranium from the soluble sodium phosphate formed during the treatment with the NaOH and the water, washing the mixture of insoluble hydroxides with dilute NaOH until the phosphorus pentoxide content in relation to the weight of the hydroxides is less than 1 percent, and separating the rare earth compounds from the thorium compounds and uranium compounds.

2. A method of treating monazite in order to recover valuable products therefrom which comprises finely grinding said monazite to pass through a 200 sieve, treating said finely comminuted monazite with a substantially equal amount by weight of a NaOH solution of 55 to 70 percent concentration at about the boiling point of the solution, retreating the NaOH digested monazite with water at a temperature above 55° C., separating the mixture of insoluble hydroxides containing the rare earth elements, thorium and uranium from the soluble sodium phosphate formed during the treatment with the NaOH and the water, washing the mixture of insoluble hydroxides with dilute NaOH until the phosphorus pentoxide content in relation to the weight of the hydroxides is less than 1 percent, and separating the rare earth compounds from the thorium compounds and uranium compounds.

3. A method of treating monazite in order to recover valuable products therefrom which comprises finely grinding said monazite to pass through a 200 sieve, treating said finely comminuted monazite with a NaOH solution of 55 to 70 percent concentration at about the boiling point of the solution, retreating the NaOH digested monazite with water at a temperature above 55° C., separating the mixture of insoluble hydroxides containing the rare earth elements, thorium and uranium from the soluble sodium phosphate formed during the treatment with the NaOH and the water, washing the mixture of insoluble hydroxides with dilute NaOH until the phosphorus pentoxide content thereof is less than 1 percent by weight, and forming insoluble compounds of thorium and uranium and soluble rare earth salts, and separating said insoluble compounds and soluble salts thus formed.

4. A method of treating monazite in order to recover valuable products therefrom which comprises finely grinding said monazite to pass through a 200 sieve, treating said finely comminuted monazite with a NaOH solution of 55 to 70 percent concentration at about the boiling point of the solution, retreating the NaOH digested monazite with water at a temperature above 55° C., separating the mixture of insoluble hydroxides containing the rare earth elements, thorium and uranium from the soluble sodium phosphate formed during the treatment with the NaOH and the water, washing the mixture of insoluble hydroxides until the phosphorus pentoxide content thereof is less than 1 percent by weight, dissolving the mixture of hydroxides in a mineral acid, neutralizing said solution to a pH of about 4, whereby the thorium and uranium compounds are precipitated and the rare earth metal compounds remain in solution, separating the precipitated thorium and uranium compounds from the dissolved rare earth metal compounds, separating the thorium compounds from the uranium compounds and recovering sodium phosphate and compounds of rare earth elements, thorium and uranium.

5. A method of treating monazite in order to recover valuable products therefrom which comprises finely grinding said monazite to pass through a 200 sieve, treating said finely comminuted monazite with a NaOH solution of 55 to 70 percent concentration at about the boiling point of the solution, retreating the NaOH digested monazite with water at a temperature above 55° C., separating the mixture of insoluble hydroxides containing the rare earth elements, thorium and uranium from the soluble sodium phosphate formed during the treatment with the NaOH and the water, washing the mixture of insoluble hydroxides until the phosphorus pentoxide content in relation to the weight of the hydroxides is less than 1 percent, adding an amount of acid selected from the group consisting of hydrochloric and nitric acids sufficient to produce a pH value of about 3.2, whereby soluble rare earth salts are formed and the thorium compounds and uranium compounds remain insoluble, and separating the insoluble thorium and uranium compounds from the solution of rare earth salts.

6. A method of treating monazite in order to recover valuable products therefrom which comprises finely grinding said monazite, treating said finely comminuted monazite with a NaOH solution of 55 to 70 percent concentration at about the boiling point of the solution, retreating the NaOH digested monazite with water at a temperature above 55° C., separating the mixture of insoluble hydroxides containing the rare earth metals, thorium and uranium from the soluble sodium phosphate formed during the treatment with the NaOH and the water, washing the mixture of insoluble hydroxides until the phosphorus pentoxide content thereof is less than 1 percent by weight, dissolving the mixture of hydroxides in a mineral acid, neutralizing said solution to a pH of about 4 whereby the thorium and uranium compounds are precipitated and the rare earth metal compounds remain in solution, separating the precipitated thorium and uranium compounds from the dissolved rare earth metal compounds, dissolving the thorium and uranium compounds in a mineral acid selected from the group consisting of hydrochloric and nitric acid, separating the undissolved residue from the solution of thorium and uranium compounds, adding dilute sulphuric acid to said solution whereby thorium precipitates and crystallizes as the sulphate salt and uranium remains in solution, separating the thorium salt from the uranium in solution, and recovering sodium phosphate and compounds of rare earth metals, thorium and uranium.

7. A method of treating monazite in order to recover valuable products therefrom which comprises finely grinding said monazite, treating said finely comminuted monazite with a NaOH solution of 55 to 70 percent concentration at about the boiling point of the solution, retreating the NaOH digested monazite with water at a temperature above 55° C., separating the mixture of insoluble hydroxides containing the rare earth elements, thorium and uranium from the soluble sodium phosphate formed during the treatment with the NaOH and the water, washing the mixture of insoluble hydroxides until the phosphorus pentoxide content in relation to the weight of the hydroxides is less than 1 percent, adding an amount of acid selected from the group consisting of hydrochloric and nitric acids sufficient to produce a pH value of about 3.2, whereby soluble rare earth salts are formed and the thorium and uranium compounds remain insoluble, separating the insoluble thorium compounds and uranium compounds from the solution of rare earth salts, dissolving the thorium compounds and uranium compounds in a mineral acid selected from the group consisting of hydrochloric and nitric acid, separating the undissolved residue from the solution of thorium compounds and uranium compounds, adding dilute sulphuric acid to said solution whereby thorium precipitates and crystallizes as the sulphate salt and uranium remains in solution and separating the thorium salt from the uranium solution.

8. The process as set forth in claim 7, further characterized in that said uranium solution is further treated first by adding a potassium salt thereto, to precipitate the remaining thorium as the double salt thereof, and to carry along the remaining rare earth compounds, and secondly by separating the thorium and rare earth compounds so precipitated from the uranium solution.

9. The process as set forth in claim 8, further characterized in that said thorium compounds and rare earth compounds so precipitated are treated with caustic soda to produce the hydroxides thereof, and said hydroxides are then washed and recycled.

10. The process as set forth in claim 9, further characterized in that said uranium solution from which said thorium compounds and rare earth compounds have been separated is clarified by treating said solution with sodium carbonate, filtering said solution, and precipitating the uranium compounds from the filtrate.

References Cited in the file of this patent

UNITED STATES PATENTS

| | | |
|---|---|---|
| 617,636 | Buddeus | Jan. 10, 1899 |
| 1,366,128 | McCoy | Jan. 18, 1921 |
| 2,196,593 | Muskat | Apr. 9, 1940 |

FOREIGN PATENTS

| | | |
|---|---|---|
| 315,371 | Germany | Oct. 22, 1919 |
| 39,105 | India | Mar. 22, 1949 |

OTHER REFERENCES

Lunge, Sulphuric Acid and Alkali, vol. 2, part 2, 3rd ed. (1909), pages 860–870. Pub. by Gurney and Jackson, London.